(12) United States Patent
Basso et al.

(10) Patent No.: US 10,877,951 B2
(45) Date of Patent: *Dec. 29, 2020

(54) NETWORK CONTROL SOFTWARE NOTIFICATION AND INVALIDATION OF STATIC ENTRIES

(71) Applicant: International Business Machines Corporation, Armonk, NY (US)

(72) Inventors: Claude Basso, Nice (FR); Josep Cors, Rochester, MN (US); Venkatesh K. Janakiraman, Cupertino, CA (US); Sze-Wa Lao, Fremont, CA (US); Sameer M. Shah, Cupertino, CA (US); David A. Shedivy, Rochester, MN (US); Ethan M. Spiegel, Mountain View, CA (US); Natarajan Vaidhyanathan, Carrboro, NC (US); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

This patent is subject to a terminal disclaimer.

(21) Appl. No.: 14/161,347

(22) Filed: Jan. 22, 2014

(65) Prior Publication Data

US 2015/0207663 A1 Jul. 23, 2015

(51) Int. Cl.
*H04L 12/24* (2006.01)
*G06F 16/23* (2019.01)
(Continued)

(52) U.S. Cl.
CPC ............. *G06F 16/23* (2019.01); *G06F 21/53* (2013.01); *H04L 63/101* (2013.01); *H04W 40/242* (2013.01)

(58) Field of Classification Search
CPC ..... H04L 45/54; H04L 63/0236; H04L 45/02; H04L 12/4641; H04L 41/12;
(Continued)

(56) References Cited

U.S. PATENT DOCUMENTS

| 6,230,235 B1 * | 5/2001 | Lu | G06F 9/5016 365/222 |
| 6,445,709 B1 * | 9/2002 | Chiang | H04L 12/467 370/399 |

(Continued)

FOREIGN PATENT DOCUMENTS

| EP | 1155537 A1 | 11/2001 |
| EP | 1319296 B1 | 4/2007 |

(Continued)

OTHER PUBLICATIONS

U.S. Appl. No. 14/053,657 entitled "Handling Errors in Ternary Content Addressable Memories," filed Oct. 15, 2013 by Todd A. Greenfield et al.

(Continued)

*Primary Examiner* — Muhammad Raza
(74) *Attorney, Agent, or Firm* — Patterson + Sheridan, LLP

(57) ABSTRACT

Techniques are disclosed for notifying network control software of new and moved source MAC addresses. In one embodiment, a switch may redirect a packet sent by a new or migrated virtual machine to the network control software as a notification. The switch does not forward the packet, thereby protecting against denial of service attacks. The switch further adds to a forwarding database a temporary entry which includes a "No_Redirect" flag for a new source MAC address, or updates an existing entry for a source MAC address that hits in the forwarding database by setting the "No_Redirect" flag. The "No_Redirect" flag indicates whether a notification has already been sent to the network (Continued)

control software for this source MAC address. The switch may periodically retry the notification to the network control software, until the network control software validates the source MAC address, depending on whether the "No_Redirect" is set.

20 Claims, 5 Drawing Sheets

(51) Int. Cl.
  *H04L 29/06* (2006.01)
  *G06F 21/53* (2013.01)
  *H04W 40/24* (2009.01)

(58) Field of Classification Search
  CPC ... H04L 12/437; H04L 45/025; H04L 41/046; H04L 12/4625; H04L 49/70; H04L 43/028; H04L 63/101; H04L 41/14; H04L 47/30; H04L 45/32; G06F 17/30345; G06F 13/36; G06F 16/23; G06F 21/53; H04W 40/242
  See application file for complete search history.

(56) References Cited

U.S. PATENT DOCUMENTS

| | | | |
|---|---|---|---|
| 6,507,564 B1 * | 1/2003 | Merchant | H04L 43/50 370/244 |
| 7,787,476 B2 | 8/2010 | Shimizu et al. | |
| 8,160,080 B1 * | 4/2012 | Arad | H04L 45/028 370/401 |
| 8,238,324 B2 | 8/2012 | Karaoguz et al. | |
| 8,259,726 B2 | 9/2012 | Subramanian et al. | |
| 8,261,317 B2 | 9/2012 | Litvin et al. | |
| 8,358,655 B2 | 1/2013 | Wang et al. | |
| 8,365,294 B2 | 1/2013 | Ross | |
| 8,370,834 B2 | 2/2013 | Edwards et al. | |
| 8,473,557 B2 | 6/2013 | Ramakrishnan et al. | |
| 9,213,595 B2 | 12/2015 | Greenfield et al. | |
| 2004/0032873 A1 * | 2/2004 | Basso | H04L 12/56 370/401 |
| 2004/0054655 A1 * | 3/2004 | Brown | H04L 12/4625 |
| 2004/0117438 A1 | 6/2004 | Considine et al. | |
| 2004/0160954 A1 * | 8/2004 | Shimizu | H04L 45/745 370/389 |
| 2008/0240106 A1 * | 10/2008 | Schlenk | H04L 12/4625 370/392 |
| 2009/0182928 A1 | 7/2009 | Becker et al. | |
| 2009/0254973 A1 * | 10/2009 | Kwan | H04L 63/0236 726/2 |
| 2010/0146599 A1 * | 6/2010 | Padmanabha | G06F 21/335 726/5 |
| 2010/0165994 A1 * | 7/2010 | Narayanaswamy | H04L 63/0236 370/395.53 |
| 2010/0246387 A1 * | 9/2010 | Krishnan | H04L 12/437 370/225 |
| 2011/0149969 A1 * | 6/2011 | Beecroft | H04L 45/20 370/392 |
| 2011/0274110 A1 * | 11/2011 | Mmmadi | H04L 49/30 370/392 |
| 2012/0287931 A1 | 11/2012 | Kidambi et al. | |
| 2012/0324365 A1 | 12/2012 | Momchilov et al. | |
| 2013/0031605 A1 | 1/2013 | Huston, III et al. | |
| 2013/0250965 A1 * | 9/2013 | Yakan | H04L 45/021 370/401 |
| 2015/0106676 A1 | 4/2015 | Greenfield et al. | |
| 2015/0106677 A1 | 4/2015 | Greenfield et al. | |
| 2015/0139036 A1 | 5/2015 | Liu | |
| 2015/0200812 A1 * | 7/2015 | Curtis | G06F 13/36 370/389 |
| 2015/0207655 A1 | 7/2015 | Lim | |
| 2015/0207662 A1 | 7/2015 | Basso et al. | |
| 2015/0207664 A1 | 7/2015 | Basso et al. | |
| 2015/0207666 A1 * | 7/2015 | Basso | G06F 17/30345 709/223 |

FOREIGN PATENT DOCUMENTS

| | | |
|---|---|---|
| WO | 2002019638 A3 | 3/2002 |
| WO | 2004038652 A1 | 5/2004 |
| WO | 2006020393 A1 | 2/2006 |
| WO | 2008023360 A3 | 2/2008 |
| WO | 2009062337 A1 | 5/2009 |
| WO | 2010120556 A1 | 10/2010 |
| WO | 2012091992 A1 | 7/2012 |
| WO | 2012131697 A1 | 10/2012 |
| WO | 2013019185 A1 | 2/2013 |

OTHER PUBLICATIONS

U.S. Appl. No. 14/136,041 entitled "Handling Errors in Ternary Content Addressable Memories," filed Dec. 20, 2013 by Todd A. Greenfield et al.

* cited by examiner

NETWORK CONTROL SOFTWARE NOTIFICATION AND INVALIDATION OF STATIC ENTRIES

BACKGROUND

Field of the Invention

The present invention generally relates to network control, and, more specifically, to techniques for sending notifications to network control software with denial of service (DoS) protection.

Description of Related Art

Server virtualization permits a physical computer system's hardware resources to be shared between virtual machines (VMs). Multiple VMs, each with its own operating system, run in parallel on a single physical machine, without being aware of the virtualization environment. A software entity called the hypervisor (or virtual machine monitor) monitors execution of the VMs and distributes hardware resources between the VMs.

Software exists for controlling networks and, in particular, configuring network settings for VMs. IBM VMReady® is one network control program that permits, among other things: discovery of VM MAC and IP addresses and hypervisor management interfaces for MAC and IP address and how they are connected to a physical switch; VMs to be grouped together to provide VM isolation at the layer 2 (data link layer) of the Open Systems Interconnection (OSI) model, and the same networking policies assigned to VMs in a given group; virtual networks to be configured using application programming interfaces (APIs) provided by the virtual environment; and detecting VM migration from one location to another and automatically moving network attributes such that VMs maintain their network policies as they migrate. To accomplish these and other tasks, the network control software may need to be notified of packets being received from new VMs and VMs that have moved. For example, to move network attributes in response to VM migration, network control software may need to receive notification from the switch whenever the switch detects VM migration. As another example, network control software may need to be notified by the switch in order to validate new and moved VMs. To validate new and moved VMs, the network control software may communicate with the hypervisor to determine if the VM source MAC address and source port are valid. If the hypervisor does not validate the information that is contained in the network control software notification, then the network control software will not validate the forwarding database entry and will set up an access control list (ACL) rule to discard all frames with that source MAC address. VM validation ensures that only known, registered VMs are sending traffic on the network, thereby protecting the network from unknown or malicious traffic. VM validation also allows the network control software to set up ACL rules for validated VMs. Without receiving a notification about new or moved VMs, the network control software would not know to set up such ACL rules.

One traditional technique for notifying network control software of new and moved VMs uses ACL rules on received packets to determine when a notification to the network control software is needed. Notifications then pass through a packet rate limiter which limits the rate at which notifications are sent to the network control software to not overwhelm it. However, the packet rate limiter only controls the rate of notifications and has no knowledge of the contents of the notifications. As a result, some notifications may be sent at a higher rate than desired, which wastes bandwidth, while others may be sent at a lower rate than desired, which increases the time it takes for the notification to reach the network control software. For example, assume the switch receives packets from two new VMs and decides to redirect these packets (as notifications) to the network control software. In such a case, the rate limiter may allow the packet from the first VM to be sent, but discard the packet from the second VM. As more packets are received from the second VM, probability suggests that one of those packets will eventually be sent to the network control software. However, the inability to control how often the packets are sent means that, e.g., packets from the second VM may take a long time to reach the network control software, while packets from the first VM may be sent to the network control software at a higher rate than desired.

SUMMARY

One embodiment provides a method for notifying network control software of new and moved source media access control (MAC) addresses. The method generally includes receiving, by a switch device, a first packet. The method further includes inserting into a forwarding database a temporary entry which includes the source MAC address and a flag which is set to indicate that the network control software has been notified, if the first packet includes a new source MAC address, or updating an existing entry in the forwarding database which includes the source MAC address by setting the flag for the entry, if the first packet includes a moved source MAC address. In addition, the method includes redirecting the first packet to the network control software.

Another embodiment provides a method for invalidating static entries in a forwarding database of a switch. The method generally includes inserting, by network control software, a static entry into the forwarding database. The method further includes setting, by the network control software, an age bit for the static entry, where the age bit is reset by the switch when a hit on the static entry occurs, and where the static entry is invalidated by the network control software if the network control software determines that the age bit is not reset for at least a threshold period of time.

Further embodiments of the present invention include one or more computer-readable storage media storing instructions that, when executed by a client device and a server system, cause the system to perform one or more aspects of the disclosed methods, and a system programmed to carry out one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
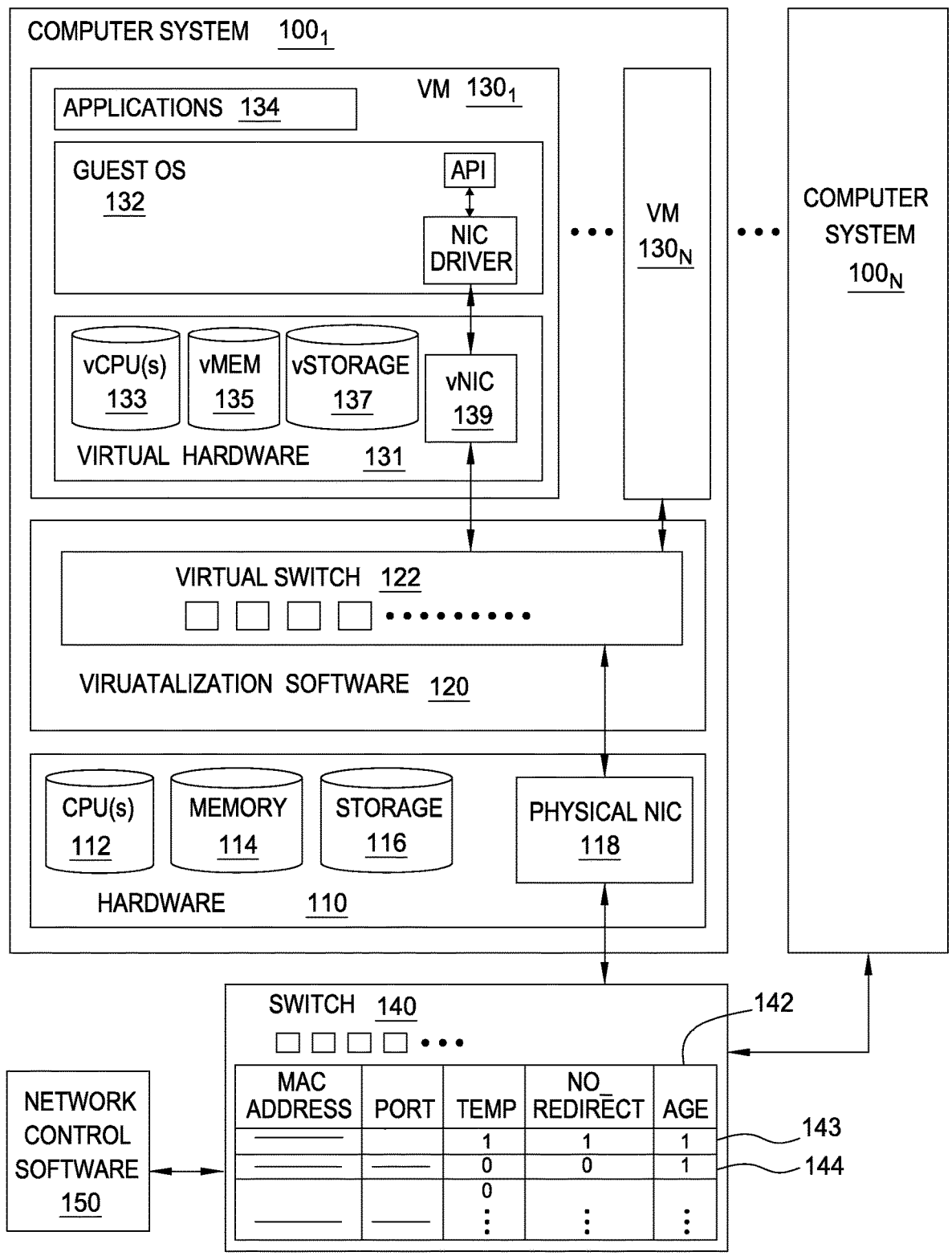
FIG. 1 depicts a block diagram of a system in which an embodiment may be implemented.

Embodiments disclosed herein provide techniques for notifying network control software of new and moved source MAC addresses. In one embodiment, the source MAC addresses are virtual machine MAC addresses corresponding to a virtual Ethernet interface on the virtual machine. A switch detects when packets are sent by a new or migrated virtual machine. When a new or migrated VM is detected, the switch may redirect the packet to the network control software as a notification, but the switch does not forward the packet, thereby protecting against denial of service (DoS) attacks by not allowing VMs that have not been validated by the network control software to send traffic through the switch. The switch may further add a temporary entry with a "No_Redirect" flag set for a new source MAC address into a forwarding database, or update an existing entry for a source MAC address that hits in the forwarding database and source MAC address movement (resulting from VM movement) is detected by setting the "No_Redirect" flag for the entry. The "No_Redirect" flag may indicate whether a notification has already been sent to the network control software for this source MAC address and thus no further notifications are necessary.

Until the network control software has validated the VM and installed, e.g., appropriate security and QoS ACL rules and adding or updating an entry in the forwarding database, the switch may periodically retry the notification to the network control software, in case previous notifications were lost or corrupted before the network control software received them. As discussed, the "No_Redirect" flag may be used to indicate that no further notifications are necessary. If the "No_Redirect" flag is not set, then the switch may retry sending the notification corresponding to that entry to the network control software. The "No_Redirect" flag is initially set when the new or moved VM is detected, and the flag may be reset by an aging function which is a background task that walks the forwarding database and resets entries having the "No_Redirect" flag set. The "No_Redirect" flag may be set again if a retry notification is sent to the network control software.

In one embodiment, the network control software may add a dynamic entry upon validating the VM. Traditional dynamic entry aging techniques may then be used to determine if the VM has become inactive, and the network control software may periodically poll the forwarding database to see if such is the case. If the network control software determines that the VM has become inactive and the source MAC address entry is no longer in the forwarding database, then the network control software may take the VM offline, change ACL rules on the switch, etc., as appropriate. In an alternative embodiment, the network control software may add a static entry upon validating the VM. In such a case, no traditional mechanisms exist to age out the static entry. In one embodiment, the network control software may set an age bit in the static entry. The physical switch resets the age bit whenever a source MAC address hit occurs on the entry and the network control software may periodically poll the forwarding database to check the age bit. When the age bit is checked, the network control software may set the age bit again if the age bit has been reset, or invalidate the entry if the age bit is still set after a threshold amount of time has elapsed.

Note, although there is (or was) a distinction between a frame, an OSI layer 2 construct, and a packet, an OSI layer 3 construct, these terms are used interchangeably herein.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 depicts a block diagram of a system in which an embodiment may be implemented. As shown, a computer system $100_1$ supports virtualization software 120, often referred to as the "hypervisor," which permits hardware resources (e.g., CPU(s) 112, memory 114, storage 116, physical network interface card (NIC) 118, etc.) to be shared among virtual machines $130_{1-N}$ and provides an interface between guest software running on virtual machines $130_{1-N}$ and the underlying hardware. Virtualization software 120 may run directly on hardware components of the computer system $100_1$ or on top of an operating system of the computer system $100_1$.

As shown, VM $130_1$ includes virtual CPU(s) (vCPU(s)) 133, virtual memory (vMEM) 135, virtual storage (vStorage) 137, and a virtual NIC (vNIC) 139. The vNIC 139 interacts with NIC drivers to send and receive data from VM $130_1$. A VM may have one or more vNICs. Virtual devices such as vNICs 139 are software abstractions implemented by virtualization software 120 using vNIC emulators. The state of each VM includes the state of its virtual devices, which is controlled and maintained by underlying virtualization software. As shown, the virtualization software 120 provides a virtual switch 122 which VMs $130_{1-N}$ may connect to. The virtual switch 122 is a software networking switch which provides an initial switching layer. The virtual switch 122 forwards packets received from VMs $130_{1-N}$ to another VMs $130_{1-N}$ or to a physical network via the physical NIC 118. A number of virtual switch implementations are publicly available, including IBM's distributed virtual switch 5000V.

Switch 140 is a physical network switching device which links network segments or devices. The switch 140 may process received packets according to, e.g., ACL rules which apply to the packets, and route the packets, if appropriate, using a MAC forwarding database 142 which stores routing information. The forwarding database 142 may be a physical table on a chip in the switch 140, and the switch 140 may provide an interface for accessing the forwarding database 142 such that the network control software 150 can modify what is in the forwarding database 142. Illustratively, the forwarding database 142 stores entries which include MAC address, port, "No_Redirect," "Temp," and "Age" fields. The entries may also include other fields, such as an address type (e.g., static or dynamic) field, VLAN field, etc. The "No_Redirect" field in particular is a flag which may be set to indicate that a notification to network control software 150 has already been attempted. The "No_Redirect" flag may initially be set by the switch 140 when the switch 140 detects a new or moved VM, and this flag may later be reset by an aging function that walks the forwarding database and resets entries having the "No_Redirect" flag set. The "No_Redirect" flag may then be set again if another packet is received whose source MAC address hits on the entry, the VM has not yet been validated, and the switch sends another notification to the network control software 150. The "Temp" field is a flag which may be set to indicate that the entry is temporary. In one embodiment, temporary entries are created for new source MAC addresses before VMs associated therewith have been validated by the network control software 150. The "Age" field stores a bit used to age out static entries. The switch 154 may reset the age bit when a source MAC address hit occurs on the entry, and the network control software 150 may periodically poll the forwarding database to check the age bit. When checking the age bit, the network control software 150 may set the age bit again if the age bit has been reset, or invalidate the entry if the age bit is still set after a threshold amount of time has elapsed.

The switch 140 may transmit notifications of new and moved VMs to the network control software 150 which is responsible for configuring network settings for VMs. One example of network control software program is IBM VMReady®. Such network control software may run on a microprocessor that communicates with the switch 140 over a network. In one embodiment, the network control software is notified of packets received from new VMs and VMs that have moved in order to, e.g., move network attributes in response to VM migration, add security and quality of service (QoS) rules for new VMs. In one embodiment, the switch 140 may determine that a packet was sent by a new or moved VM based on whether the source MAC address in the packet misses in the forwarding database 142, or hits on an entry in the forwarding database 142 with routing information in the port field that does not match the ingress port of the packet. In such cases, the switch may send a copy of the received packet to the network control software 150 as a notification. Here, the switch 140 does not forward the packet, thereby protecting against denial of service (DoS) attacks by not allowing VMs that have not been validated by the network control software 150 to send traffic through the switch 140. The switch 140 may further add a temporary ("temp") entry with "No_Redirect" flag set for a new source MAC address into the forwarding database 142, or update an existing entry for a source MAC address by setting the "No_Redirect" flag. The switch 140 may also periodically retry the notification to the network control software, depending on whether the "No_Redirect" flag for a forwarding database entry is set. For example, if the switch 140 receives another packet that hits on an entry, and the "No_Redirect" flag is not set for that entry, then this indicates that a retry should be sent. In such a case, the switch 140 may send another notification to the network control software 150, and set the "No_Redirect" flag.

Figure 2:
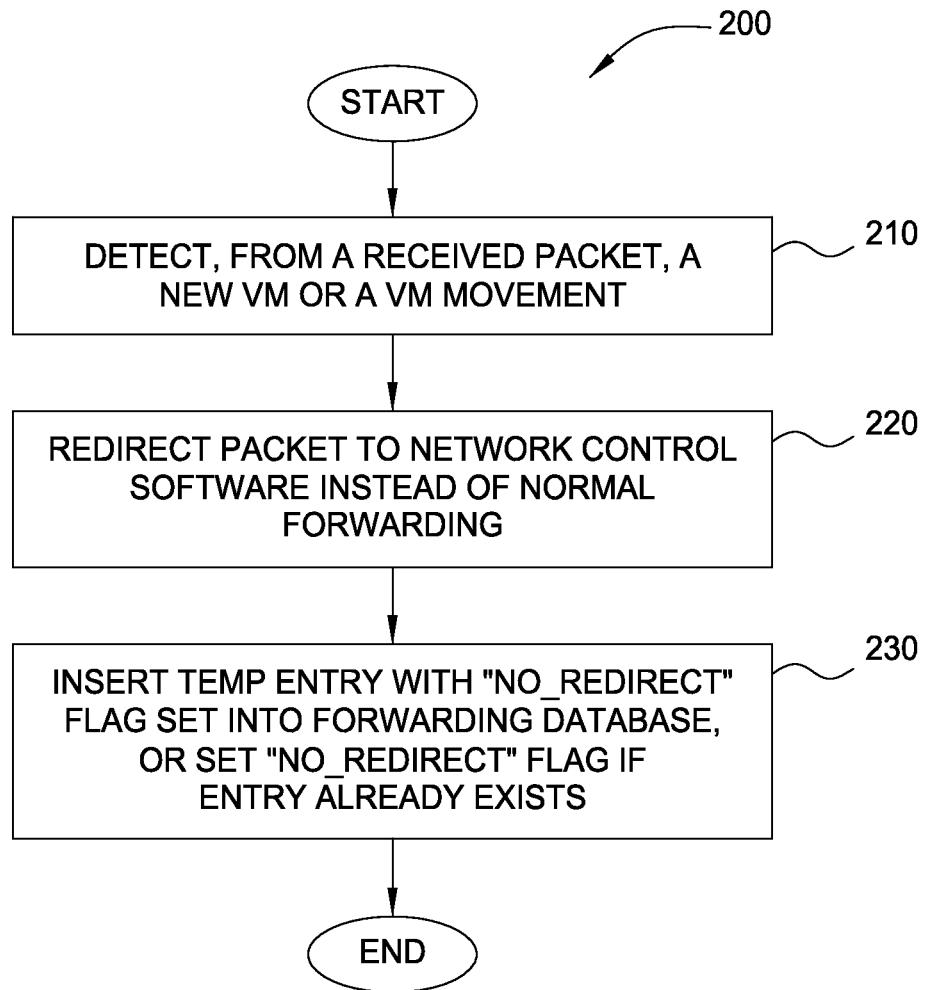
FIG. 2 illustrates a method for notifying network control software of a new or moved virtual machine, according to an embodiment.

FIG. 2 illustrates a method 200 for notifying network control software of a new or moved virtual machine, according to an embodiment. As shown, the method 200 begins at step 210, where a switch detects, from a received packet, a new VM or VM movement. In one embodiment, an ACL rule may be established for detecting new VMs and VM movement. Based on such ACL rules, the switch may determine that a packet was sent from a new VM if the source MAC address of the packet misses in a forwarding database. The switch may identify the source MAC address as belonging to a VM by comparing the organizationally unique identifier (OUI) in the MAC address to known hypervisors. The switch may determine that a packet was sent from a moved VM if the source MAC address of the packet hits in the forwarding database, but the routing information (e.g., a port over which the source MAC address is reachable) in the forwarding database does not match the ingress port from which the packet was received. That is, the switch may detect a new VM or VM movement based on whether the source MAC address hits in the forwarding database and, if the packet hits, whether the stored routing information matches the ingress port.

At step 220, the switch redirects the packet to the network control software, instead of performing normal forwarding. The redirected packet serves as notification to the network control software of the new or moved VM. In one embodiment, an access control list (ACL) rule may indicate to redirect the packet. Note, the switch does not learn the source MAC address of the received packet, by inserting a corresponding entry into the forwarding database in the case of a source MAC address miss, or updating a corresponding entry in the forwarding database in the case of source MAC address movement. Doing so provides denial of service (DoS) protection, as the switch does not forward packets having any given source MAC address until the network control software has validated the VM associated therewith. As a result, rogue VMs would be unable to send traffic through the switch.

At step 230, the switch inserts a temp entry with a "No_Redirect" flag set, or sets a "No_Redirect" flag of an entry which corresponds to the source MAC address of the received packet if such an entry already exists. In one embodiment, an ACL rule may specify to insert the temp entry or update the existing entry, and the switch may perform the insert or update according to the ACL rule. The temp entry being inserted does not include any routing information.

As discussed, the "No_Redirect" flag indicates that network control software has already been sent notification that the entry corresponds to a new VM or a moved VM. When further packets are received with source MAC addresses that hit on an entry with "No_Redirect"=1, then the switch will not send a notification to the network control software. This prevents the network control software from being overwhelmed by the same notification. In one embodiment, the switch may include a function to age forwarding database entries that have the "No_Redirect" flag set. Such a function may walk the forwarding database and reset the "No_Redirect" flag for each entry that has this flag set. In such a case, a latency for walking the forwarding database may be tunable by, e.g., setting a programmable delay timer.

Figure 3:
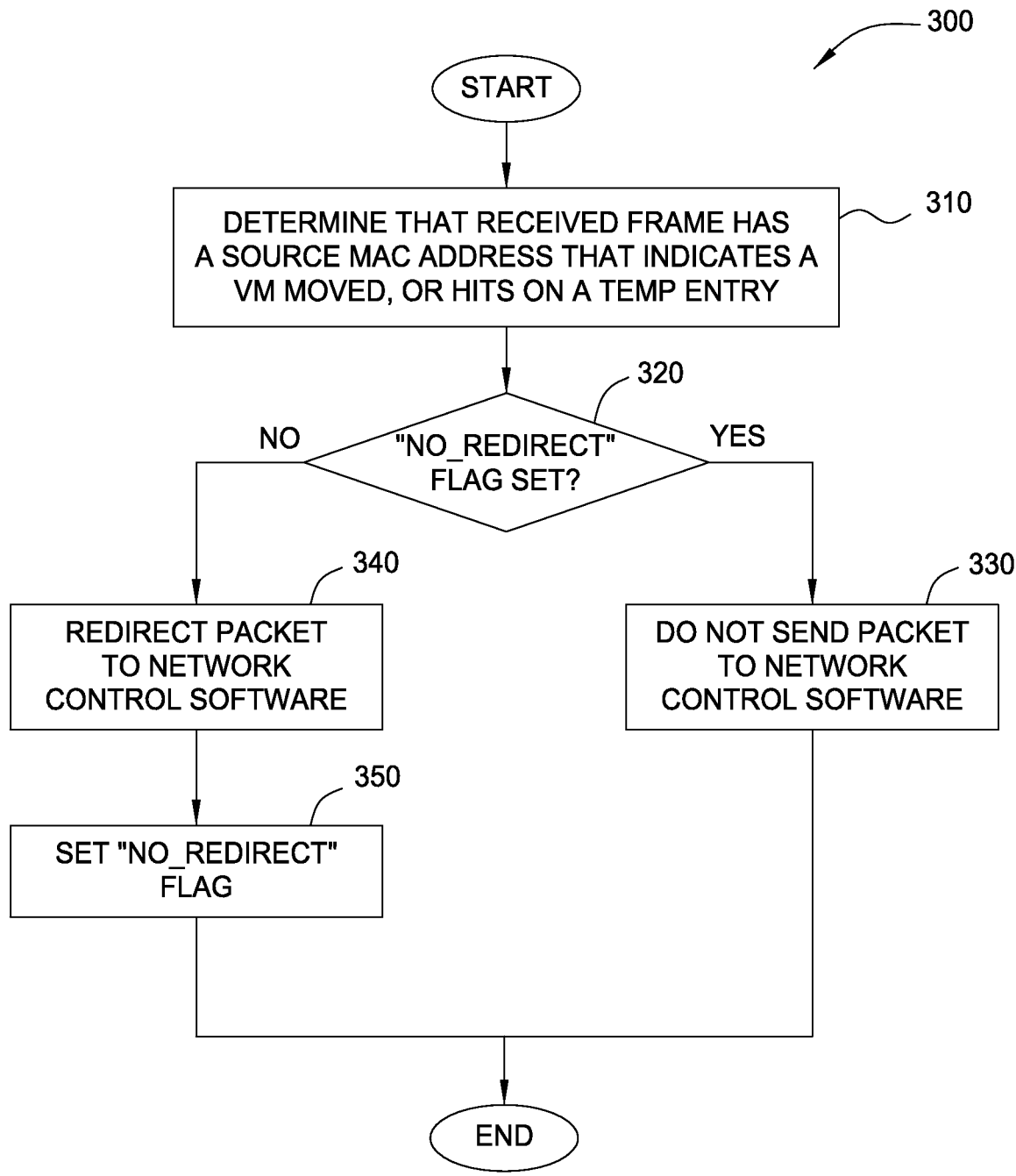
FIG. 3 illustrates a method for resending a notification to network control software about a new or moved virtual machine, according to an embodiment.

FIG. 3 illustrates a method 300 for resending a notification to network control software about a new or moved virtual machine, according to an embodiment. As shown, the method 300 begins at step 310, where a switch determines that a received packet includes a source MAC address that indicates VM movement, or that hits on a temp entry in a forwarding database. Once again, VM movement may be detected by determining whether routing information in the forwarding database for the source MAC address matches the ingress port from which the packet was received. If either VM movement is detected or the source MAC address hits on a temp entry, then the switch does not forward the received packet. Doing so provides DoS protection, similar to the discussion above with respect to FIG. 2.

At step 320, the switch determines whether a "No_Redirect" flag is set for the entry corresponding to the source MAC address. As discussed, the "No_Redirect" flag being set indicates that network control software has already been sent notification about the entry. In one embodiment, the switch may initially set the "No_Redirect" flag when a new or moved VM is detected and the packet received from the new or moved VM is redirected to the network control software. In another embodiment, an aging function may walk the forwarding database and reset the "No_Redirect" flag for entries which have this flag set.

If the "No_Redirect" flag is set, then at step 330, the switch does not send the packet to the network control software. As the "No_Redirect" flag being set indicates that a previous notification was sent to the network control software, no further packets are sent to prevent the network control software from being overwhelmed by the same notification.

If the "No_Redirect" flag is not set, then at step 340, the switch redirects the packet to the network control software. This redirected packet serves as a retry notification. One or more retries may be needed where previous notification packets were lost or corrupted before reaching the network control software.

At step 350, the switch sets the "No_Redirect" flag. As discussed, this ensures that additional notifications are not sent to the network control software to prevent the network control software from being overwhelmed. An aging function which walks the forwarding database may later reset the "No_Redirect" flag.

Figure 4:
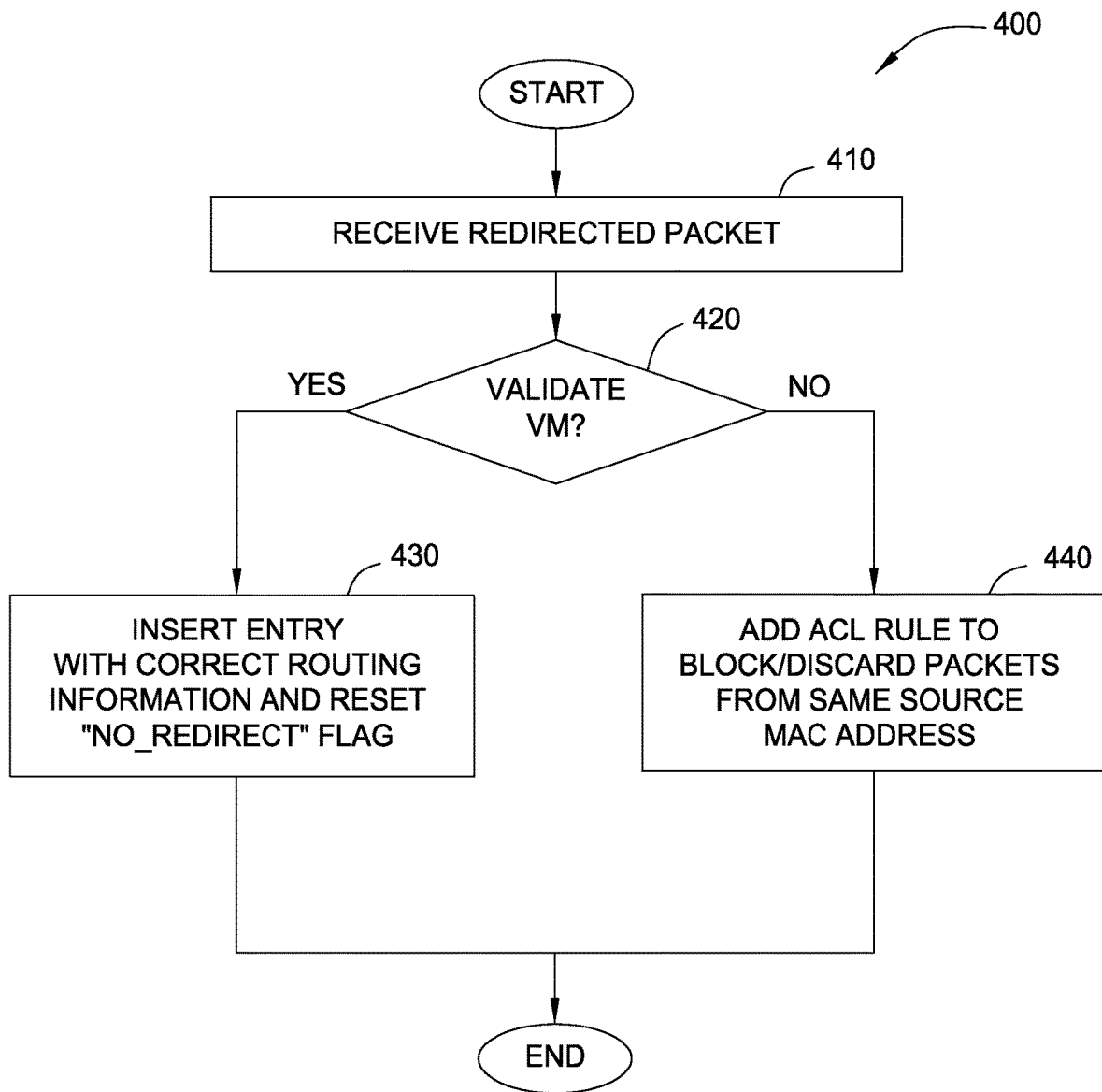
FIG. 4 illustrates a method for network control software to validate a virtual machine, according to an embodiment.

FIG. 4 illustrates a method 400 for network control software to validate a VM, according to an embodiment. As shown, the method 400 begins at step 410, where the network control software receives a redirected packet. As discussed, a switch may redirect a packet to the network control software upon receiving the packet and determining that its sender was a new or a moved VM. Alternatively, the switch may redirect the packet to the network control software if the switch receives a packet whose source MAC address hits on a temp entry in a forwarding database, and the "No_Redirect" flag is not set for that entry.

At step 420, the network control software determines whether to validate the VM corresponding to the received packet. In one embodiment, to validate new and moved VMs, the network control software may communicate with the hypervisor associated with the VM to determine if the VM source MAC address and source port are valid. As discussed, VM validation ensures that only known, registered VMs are sending traffic on the network, thereby protecting the network from unknown or malicious traffic. VM validation also allows the network control software to set up ACL rules for validated VMs.

If the network control software validates the VM, then at step 430, the network control software inserts an entry with correct routing information and resets the "No_Redirect" flag. Note, although reference is made to inserting a forwarding database entry, the network control software may, when appropriate, update an existing entry (which may be a temp entry) with the correct routing information and reset the "No_Redirect" flag. In one embodiment, the network control software may insert a dynamic entry. In such a case, the physical switch may also support an option to synchronize the new dynamic entry with all other forwarding databases in the system. In an alternative embodiment, the network control software may insert a static entry. In this case, the network control software may be responsible for inserting the same new static entry into all other forwarding databases. In addition to inserting the dynamic or static entry, the network control software may also, e.g., install appropriate security and quality of service ACLs, as well as other ACL rules such as class of service and VLAN-based rules.

If the network control software declines to validate the VM, then at step 440, the network control software adds an ACL rule to block or discard packets with the same source MAC address. Doing so ensures that future packets with this source MAC address are not forwarded by the switch. Note, the network control software does not need to invalidate the entry if the network control software decides not to validate the VM. Instead, if the entry is a temp entry, then the entry may eventually age out. If the entry is a static or dynamic entry, as in the case of VM movement, then the entry remains valid. Note, if the "No_Redirect" flag is set for the entry, the flag may eventually be reset by an aging function, discussed above. However, since the new ACL rule blocks or discards packets with the source MAC address, this source MAC address will not be learned again in the FDB, and also no new notifications will be sent to the network control software even if the "No_Redirect" flag is reset.

Figure 5:
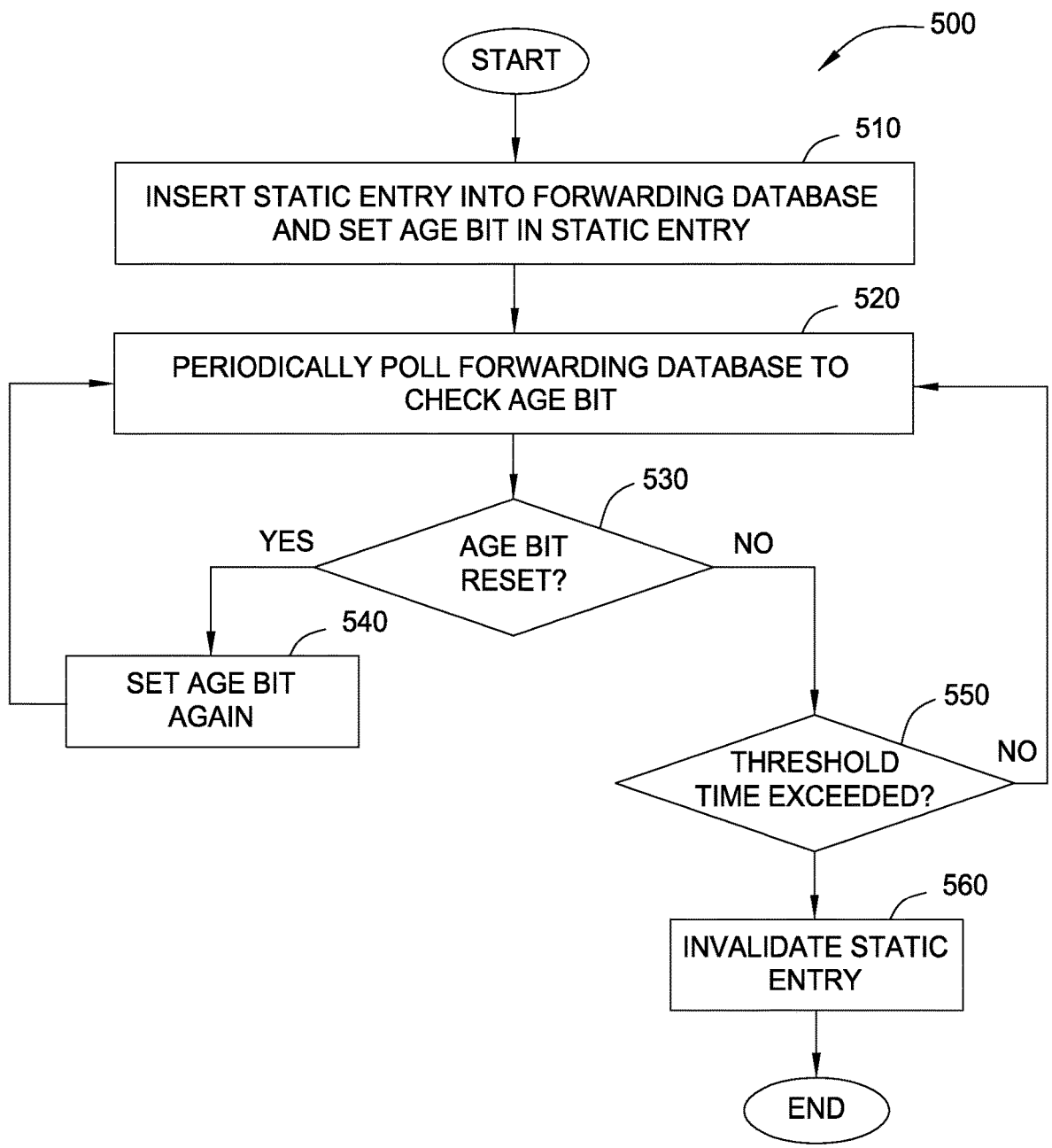
FIG. 5 illustrates a method for invalidating a static forwarding database entry, according to an embodiment.

FIG. 5 illustrates a method 500 for invalidating a static forwarding database entry, according to an embodiment. In the alternative case of a dynamic entry, the forwarding database may dynamically age the entry to invalidate entries that are not being used. In such a case, the network control software may periodically poll the forwarding database to see if the dynamic entry has been aged out. However, static entries are generally controlled by software, and switch hardware is prohibited from invalidating static entries or changing the routing information of static entries. As a result, a different mechanism than traditional dynamic entry aging is needed to invalidate static entries that are not being used.

As shown, the method 500 begins at step 510, where network control software inserts a static entry into the forwarding database and sets an age bit in the static entry. As discussed, the network control software may insert the static entry upon validating a source MAC address of a new or moved VM. After being inserted, the switch may reset the age bit whenever a source MAC address hit occurs on the static entry. That is, whenever the switch receives a packet whose source MAC address hits on the static entry, the switch may reset the age bit.

At step 520, the network control software periodically polls the forwarding database to check the age bit. As discussed, the age bit may initially be set when the network control software inserts the static entry into the forwarding database, and the switch may reset the age bit whenever a hit on the static entry occurs. The network control software may thus poll the forwarding database to determine whether the age bit is still set or not.

If the network control software determines that the age bit has been reset at step 530, then at step 540, the network control software sets the age bit again, and the method 500 returns to step 520. The age bit being reset indicates that the entry is still being used, so the network control software simply sets the age bit again. Similar to the discussion above, the switch may reset the age bit at a later time if another packet is received that hits on this static entry.

If, on the other hand, the network control software determines that the age bit has not been reset, then at step 550, the network control software determines if a threshold amount of time has been exceeded. If the threshold amount of time has not been exceeded, then the method 500 returns to step 520. If, however, the threshold amount of time has been exceeded, then this indicates that the static entry is no longer in use because, e.g., the VM has become inactive. In such a case, the network control software invalidates the static entry at step 560.

Although discussed above primarily with respect to new and moved VMs, techniques disclosed herein may generally be used with any network control software that needs to be notified of new or moved source MAC addresses detected by a switch, and any static entries that need to be aged out if unused. Further, although discussed above primarily with respect to validating VMs, the network control software may use notification information in any other way it chooses. For example, the network control software may maintain a shadow copy of the forwarding database using the contents of packets that are redirected by the switch to the network control software.

Advantageously, embodiments disclosed herein permit a switch to notify network control software of new and moved source MAC addresses. The notification mechanism is content aware, such that a notification is initially sent for each new or moved source MAC address that the switch detects. For example, if two packets with new MAC addresses were received substantially simultaneously, notifications would be sent for both, rather than for just one as in previous packet rate limiter approaches. More notifications may be sent as retries based on a "No_Redirect" flag, which may be set after a notification is sent and periodically reset by an aging function. Further, static entries may be aged out by the network control software, working together with the physical switch, using an age bit.

While the foregoing is directed to embodiments of the present invention, other and further embodiments of the invention may be devised without departing from the basic scope thereof, and the scope thereof is determined by the claims that follow.

What is claimed is:

1. One or more non-transitory computer-readable media storing instructions of network control software in communication with a switch over a network, the instructions executable to perform an operation to invalidate static entries in a forwarding database of the switch, the operation comprising:

receiving, by the network control software over the network, a packet redirected for validation in order to provide denial-of-service protection for the network, wherein the packet is, in lieu of being forwarded to a specified target, redirected by the switch responsive to the switch detecting, based on whether a source MAC address and an ingress port of the redirected packet have matches in the forwarding database, that the packet is from a virtual machine that is new or migrated, wherein based on the source MAC address, the forwarding database is updated to include a temporary entry corresponding to the source MAC address and having a no-redirect flag that is set to true to disable any further notification relating to the virtual machine because the network control software has been notified of the virtual machine, the temporary entry having a temporary flag set to true;

upon determining that the source MAC address and a source port specified in the redirected packet are valid according to a hypervisor that provides the virtual machine, inserting, by the network control software when executed by one or more computer processors, a static entry into the forwarding database of the switch and setting an age bit for the static entry, after which the switch forwards at least one subsequent packet from the virtual machine based on the static entry, wherein the switch is precluded from invalidating the static entry in the forwarding database, wherein one or more quality-of-service (QoS) rules are added for the virtual machine, wherein the no-redirect flag, the temporary flag, and the age bit are separate fields in the forwarding database;

periodically polling, by the network control software, the forwarding database of the switch in order to determine whether the age bit for the static entry has been reset, wherein the age bit is reset by the switch to a not-set state responsive to a given source MAC address of a subsequently received packet matching the static entry;

setting the age bit again, by the network control software, based on determining that the age bit for the static entry has been reset during the periodic polling; and invalidating the static entry, by the network control software, based on determining that the age bit for the static entry has not been reset for at least a threshold period of time.

2. The one or more non-transitory computer-readable media of claim 1, wherein the source MAC address is selected from a new source MAC address and a moved source MAC address, wherein the temporary entry is selected from a new temporary entry and an existing temporary entry, wherein the static entry is inserted into the forwarding database after validating the new source MAC address that misses in the forwarding database or the moved source MAC address that hits in the forwarding database but routing information in a port field in the forwarding database does not match the ingress port, wherein the switch is configured to:

insert into the forwarding database the new temporary entry, which includes the new source MAC address and the no-redirect flag, wherein the new temporary entry is inserted based on determining that the packet includes the new source MAC address;

update in the forwarding database the existing temporary entry, which includes the moved source MAC address, by setting the no-redirect flag to true to indicate that the network control software has been notified, wherein the forwarding database is updated based on determining that the packet includes the moved source MAC address; and forward the packet towards the network control software.

3. The one or more non-transitory computer-readable media of claim 2, wherein the packet is not forwarded towards a port associated with a target MAC address included in the packet.

4. The one or more non-transitory computer-readable media of claim 2, wherein the new temporary entry does not include routing information.

5. The one or more non-transitory computer-readable media of claim 2, wherein the packet comprises a first packet, wherein the switch is further configured to:

determine that a second packet has a source MAC address that matches the new temporary entry or the existing temporary entry; and if the no-redirect flag is cleared for the new temporary entry or the existing temporary entry, redirect the second packet to the network control software.

6. The one or more non-transitory computer-readable media of claim 2, the operation further comprising adding an access control list (ACL) rule to block or discard packets received from the source MAC address of the packet if the source MAC address is not validated.

7. The one or more non-transitory computer-readable media of claim 2, wherein the packet was transmitted by the virtual machine.

8. A system for network control software in communication with a switch over a network to invalidate static entries in a forwarding database of the switch, the system comprising:

one or more computer processors;

a memory containing the network control software, which is executable by the one or more computer processors to perform an operation comprising:

receiving, over the network, a packet redirected for validation in order to provide denial-of-service protection for the network, wherein the packet is, in lieu of being forwarded to a specified target, redirected by the switch responsive to the switch detecting, based on whether a source MAC address and an ingress port of the redirected packet have matches in the forwarding database, that the packet is from a virtual machine that is new or migrated, wherein based on the source MAC address, the forwarding database is updated to include a temporary entry corresponding to the source MAC address and having a no-redirect flag that is set to true to disable any further notification relating to the virtual machine because the network control software has been notified of the virtual machine, the temporary entry having a temporary flag set to true;

upon determining that the source MAC address and a source port specified in the redirected packet are valid according to a hypervisor that provides the virtual machine, inserting a static entry into the forwarding database of the switch and setting an age bit for the static entry, after which the switch forwards at least one subsequent packet from the virtual machine based on the static entry, wherein the switch is precluded from invalidating the static entry in the forwarding database, wherein one or more quality-of-service (QoS) rules are added for the virtual machine, wherein the no-redirect flag, the temporary flag, and the age bit are separate fields in the forwarding database;

periodically polling the forwarding database of the switch in order to determine whether the age bit for the static entry has been reset, wherein the age bit is reset by the switch to a not-set state responsive to a given source MAC address of a subsequently received packet matching the static entry;

setting the age bit again based on determining that the age bit for the static entry has been reset during the periodic polling; and invalidating the static entry based on determining that the age bit for the static entry has not been reset for at least a threshold period of time.

9. The system of claim 8, wherein the source MAC address is selected from a new source MAC address and a moved source MAC address, wherein the temporary entry is selected from a new temporary entry and an existing temporary entry, wherein the static entry is inserted into the forwarding database after validating the new source MAC address that misses in the forwarding database or the moved source MAC address that hits in the forwarding database but routing information in a port field in the forwarding database does not match the ingress port, wherein the switch is configured to:

insert into the forwarding database the new temporary entry, which includes the new source MAC address and the no-redirect flag, wherein the new temporary entry is inserted based on determining that the packet includes the new source MAC address;

update in the forwarding database the existing temporary entry, which includes the moved source MAC address, by setting the no-redirect flag to true to indicate that the network control software has been notified, wherein the forwarding database is updated based on determining that the packet includes the moved source MAC address; and forward the packet towards the network control software.

10. The system of claim 9, wherein the packet comprises a first packet, wherein the switch is further configured to:

determine that a second packet has a source MAC address that matches the new temporary entry or the existing temporary entry; and if the no-redirect flag is cleared for the new temporary entry or the existing temporary entry, redirect the second packet to the network control software.

11. The system of claim 8, wherein the source MAC address corresponds to a virtual Ethernet interface on the virtual machine.

12. The system of claim 8, wherein the network control software is configured to maintain a shadow copy of the forwarding database using contents of packets redirected by the switch to the network control software.

13. The system of claim 8, wherein the network control software is configured to protect the network from unknown traffic by permitting only validated virtual machines to send traffic on the network.

14. The system of claim 8, wherein the switch and the network control software are separate entities.

15. The system of claim 14, wherein the no-redirect flag is periodically cleared by an aging function that walks the forwarding database.

16. The system of claim 15, wherein the source MAC address corresponds to a virtual Ethernet interface on the virtual machine; wherein the at least one subsequent packet is forwarded to a target MAC address and an associated port indicated in the at least one subsequent packet.

17. The system of claim 16, wherein the aging function walks the forwarding database with a tunable walking latency configurable via setting a programmable delay timer:

wherein the network control software is further configured to maintain a shadow copy of the forwarding database using contents of packets redirected by the switch to the network control software.

18. The system of claim 17, wherein the network control software is further configured to protect the network from unknown traffic by permitting only validated virtual machines to send traffic on the network, including adding an access control list (ACL) rule to block or discard received packets having the source MAC address of the packet upon unsuccessful validation of the virtual machine.

19. The system of claim 18, wherein the packet comprises a first packet, wherein the switch is further configured to:

determine that a second packet has a source MAC address that matches the temporary entry corresponding to the source MAC address; and forwarding the second packet to the network control software for validation, only if the no-redirect flag is cleared.

20. The system of claim 19, wherein the network control software is further configured to, based on whether validation of the virtual machine is successful, move one or more network attributes and add one or more security rules;

wherein the virtual machine is assigned a set of resources by the hypervisor, wherein the hypervisor is configured to distribute physical resources of a computer system among a plurality of virtual machines including the virtual machine.

* * * * *